United States Patent [19]

Mills

[11] 4,045,976
[45] Sept. 6, 1977

[54] VALVE FOR SOFT ICE CREAM MACHINE

[76] Inventor: John W. Mills, 301 S. Idaho, Columbus, Kans. 66725

[21] Appl. No.: 661,760

[22] Filed: Feb. 26, 1976

[51] Int. Cl.² ............................................. A23G 9/00
[52] U.S. Cl. ..................................... 62/308; 62/342; 137/846; 222/146 C; 261/140 R
[58] Field of Search ................ 62/342, 343, 307, 308; 259/DIG. 32; 222/146 C; 261/420; 137/846–850

[56] References Cited

U.S. PATENT DOCUMENTS

| | | | |
|---|---|---|---|
| 3,304,737 | 2/1967 | Strutynski | 62/342 X |
| 3,866,801 | 2/1975 | Stapleton | 222/146 C |
| 3,898,701 | 8/1975 | La Russa | 137/846 X |
| 3,898,858 | 8/1975 | Erickson | 62/342 X |
| 3,901,272 | 8/1975 | Banners et al. | 137/846 X |
| 3,930,535 | 1/1976 | Menzel | 62/342 X |

Primary Examiner—William E. Wayner
Assistant Examiner—William E. Tapolcai, Jr.
Attorney, Agent, or Firm—Littlepage, Quaintance, Murphy, Richardson & Webner

[57] ABSTRACT

A valve for controlling the flow of air and liquid product mix from a liquid product reservoir to a freezing chamber in a soft ice cream dispensing machine has a lower tubular member snugly yet removably received within a tubular communicating line between the reservoir and freezing chamber. An air retaining chamber is fixed to the upper portion of the lower tubular member and communicates therewith. An upper tubular member fixed to the chamber extends upward to a point above the maximum anticipated level of the liquid product in the reservoir. The lower end of the upper tubular member extends somewhat inside the chamber. The upper tubular member has a small aperture near the lower end thereof opening into the liquid product reservoir. A checkvalve is attached to the lower end of the upper tubular member for retaining air in the air retaining and freezing chambers to assure the desired overrun in the ice cream. The checkvalve is preferably of the type forming a pair of lip-like portions for opposed sealing engagement.

9 Claims, 7 Drawing Figures

U.S. Patent   Sept. 6, 1977   Sheet 1 of 2   4,045,976
Fig. 1
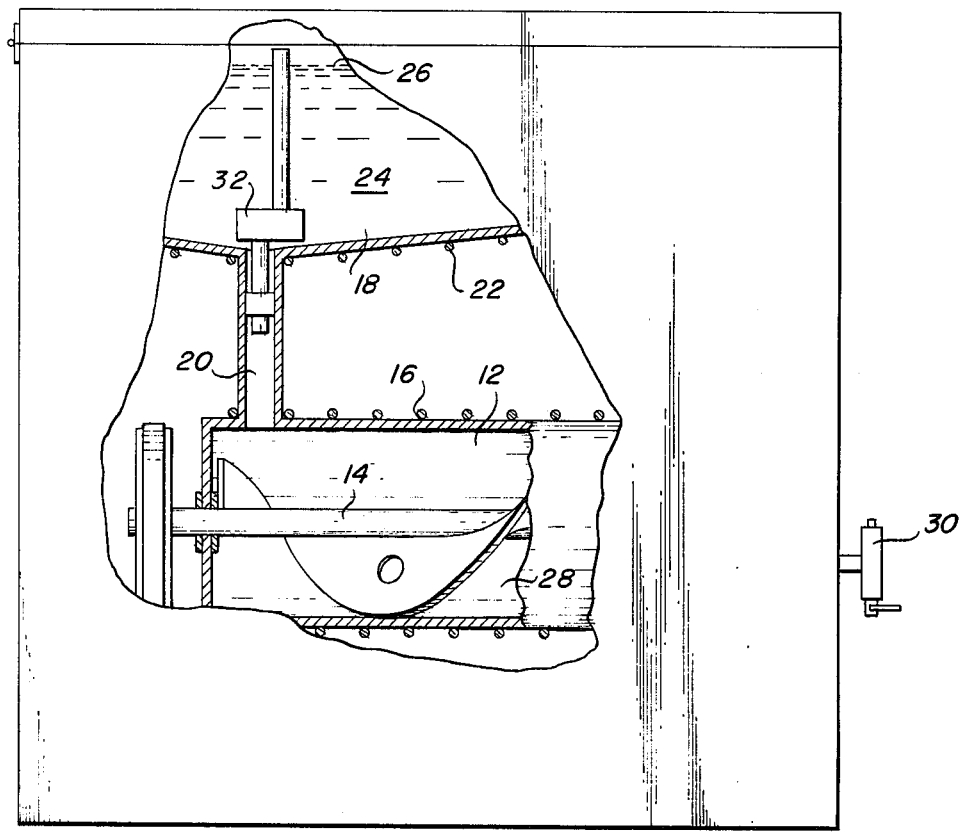
Fig. 4
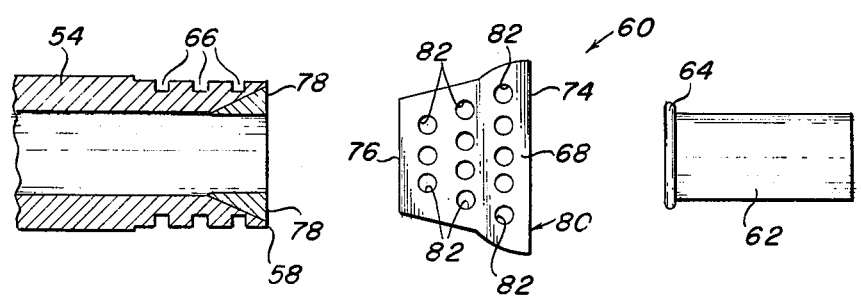
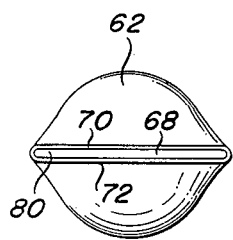
Fig. 5
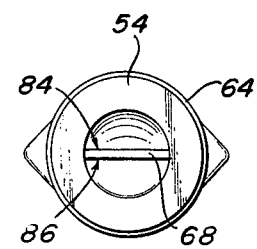
Fig. 6

VALVE FOR SOFT ICE CREAM MACHINE

BACKGROUND OF THE INVENTION

1. Field of the Invention

This invention pertains to machines for freezing and dispensing a confectionery product, particularly soft ice cream, the machine consisting in part of a freezing chamber, a liquid product reservoir located above the freezing chamber, and a tubular communicating line between the liquid product reservoir and the freezing chamber. The invention is particularly addressed to an improved air-mix feeding element for controlling the flow of air and liquid product through the tubular communicating line to assure the proper overrun in the resultant product. Of particular importance is a checkvalve included within the air-mix feeding element which is easily serviced and is the form of a pair of opposed liplike portions adapted to sealingly engage and interstitial flat plate.

2. Description of the Prior Art

Machines for freezing and dispensing a soft confectionery product such as frozen custard or ice cream generally include a freezing cylinder housing a rotary dasher. Positioned above the freezing chamber is a reservoir containing a suitable mix in the form of a liquid product which when subsequently frozen under the proper conditions will yield the desired flavor and texture. The dasher in the freezing chamber acts to whip air into the mix as well as circulate the product within the freezing chamber to assure reasonably uniform temperature, texture, and the like.

The freezing chamber and liquid product reservoir are connected in some manner so as to permit a suitable amount of new liquid product to move from the reservoir to the freezing chamber at the same time as some frozen product is being dispensed from the freezing cylinder. In the machines to which this invention applies the freezing chamber and liquid product reservoir are typically connected by an open tubular communicating line extending between the two. An air-mix feeding element may be positioned near the liquid product reservoir end of this tubular communicating line to control the amount of mix and air which is drawn into the freezing chamber. An example of the prior art is illustrated in FIG. 2 of this application. A common failing of machines of this type has been the inability of the machine to sustain the proper overrun in the dispensed product for any extended period of time.

When the frozen product is not being dispensed from the freezing cylinder the machine must periodically cycle on and off so as to maintain the temperature of the frozen product in the freezing chamber at the correct temperature. When the machine cycle on the beater or dasher also runs in order to keep the frozen product soft so it can be dispensed when needed. As the machine remains in this "standby" conditon for any extended period of time, air will tend to separate from the frozen product and escape via the tubular communicating line between the liquid product reservoir and the freezing chamber. The resultant frozen product when finally dispensed will not contain as much air as it should and as a result will lack proper taste, not stand up in a cone, and often becomes grainy. Soft ice cream normally dispensed from an apparatus of this type is most desirably served at 19° Fahrenheit with a 4-5% butterfat mix content and an overrun of approximately 50%. Typically, however, a gravity fed machine of this type not utilizing the advancement of this invention will average only about 25-30% overrun.

Other solutions have been suggested to this problem of maintaining the overrun in the frozen product including the use of elaborate pumps for introducing pressurized or compressed air into the freezing chamber. Exampls of machines using an external air pressurizing device are to be found in U.S. Pat. Nos. 3,330,127, 3,196,633, 3,147,601 and 2,565,121. The disadvantage of the addition of such elaborate pumping schemes is the increased energy which is required to run the apparatus as well as the non-convertability of most older type gravity fed machines. The advancement provided by this invention on the other hand is fully adaptable to a large group of machines of this type and has been designed to permit very simple modification and replacement even by those having only a modicum of skill in this art.

SUMMARY OF THE INVENTION

The invention generally comprises an air-mix feeding element for controlling the flow of air and liquid product from the liquid product reservoir to the freezing chamber through the tubular communicating line therebetween. The air-mix feeding element comprises a lower tubular element snugly yet removably received within the tubular communicating line at the liquid product reservoir end of that communicating line. An air-retaining chamber is fixed to the upper portion of that lower tubular member, the chamber being open to the inside of the lower tubular member. An upper tubular member is fixed to the air-retaining chamber and extends upward to a point above the maximum anticipated level of the liquid product in the liquid product reservoir. The lower end of this upper tubular member extends somewhat inside the chamber. The upper tubular member has a small aperture near the lower end thereof opening into the liquid product reservoir. A checkvalve is attached to the lower end of the upper tubular member for retaining air in the air-retaining and freezing chambers to assure the desired overrun in the frozen dispensed food product.

The checkvalve preferably comprises an elastomeric sleeve fixed to the lower end of the upper tubular member having a flat plate disposed within this elastomeric sleeve. The flat plate is of such a size and shape and is arranged such that the elastomeric sleeve is laterally stretched to form a pair of lip-like portions sealingly engaging upon the interstitial flat plate.

Preferably the flat plate has an outer periphery approximating a regular isosceles trapezoid, the narrower end of which is directed to the lower end of the upper tubular member while the wider end is positioned near the lower end of the elastomeric sleeve. The flat plate will optimumly have a plurality of regularly spaced apertures extending between opposite faces of the plate.

In one embodiment the lower tubular member extends upwardly to a point near the top of and yet within the air-retaining chamber and has an aperture near the bottom of, and opening into, the air-retaining chamber. In this embodiment the lower tubular member can also be constricted so as to form a trough between the aperture in the bottom of the air-retaining chamber and the top of this lower tubular member. In this embodiment the lower end of the upper tubular member is also positioned in the lower half of the air-retaining chamber and the small aperture opening into the liquid product reservoir permitting the introduction of mix opens through a side of the air-retaining chamber.

A particular feature of the invention is the presence of an air-retaining checkvalve which will permit machines of the type previously discussed to provide a frozen product with consistently 50% or greater overrun over extended periods of time with the use of no additional electrical energy other than that normally used during the cycling process which maintains the product in the desired condition. The particular checkvalve of this invention has the added advantage of low cost easy replaceability as well as adaptability to existing machines. Other features and advantages of an apparatus of this type will become apparent upon consideration of the following discussion of the accompanying figures illustrating certain embodiments of the invention.

BRIEF DESCRIPTION OF THE DRAWINGS

FIG. 1 is an elevation partly in section of an apparatus for freezing and dispensing a food product showing one embodiment of an improved air-mix feeding element according to this invention positioned within the apparatus.

FIG. 4 is an exploded view partially in section of the parts to be assembled to form the preferred checkvalve utilized in the air-mix feeding element of this invention.

FIG. 5 is an end view of the apparatus shown in FIG. 4 once assembled as viewed from the right end.

FIG. 6 is an end view of the apparatus of FIG. 4 once assembled as viewed from the left end.

DESCRIPTION OF THE PREFERRED EMBODIMENTS

Figure 7:
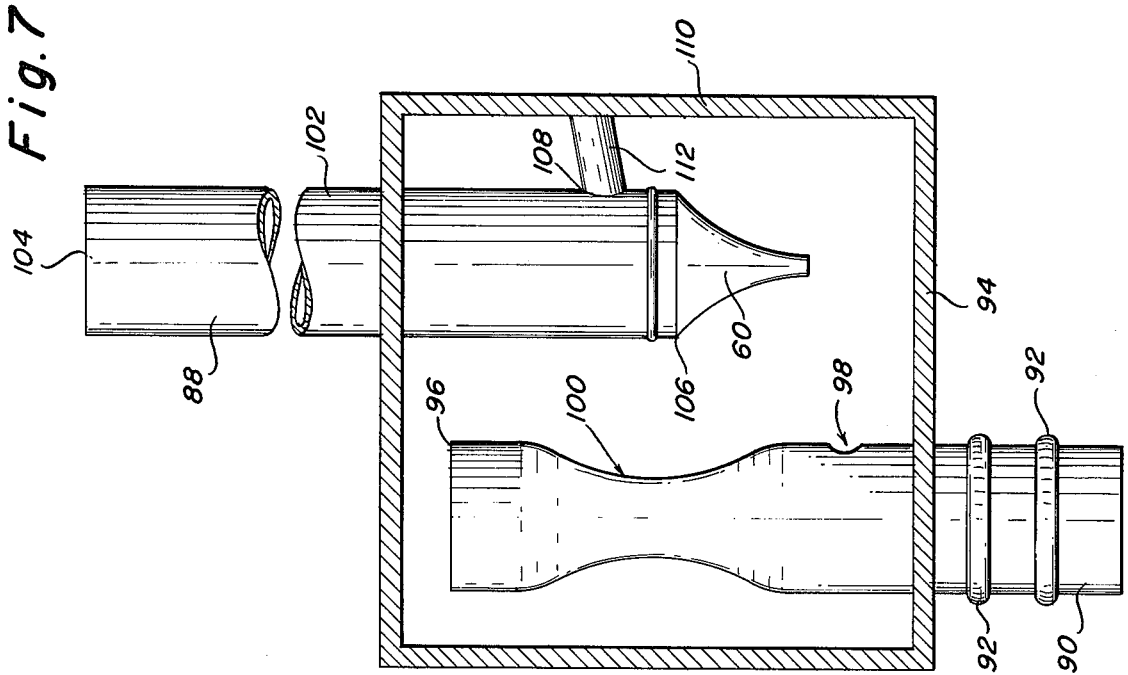
FIG. 7 is an elevation view of a second preferred embodiment of an air-mix feeding element according to this invention.

An apparatus for freezing and dispensing confectionery products such as frozen soft ice cream and the like is illustrated in FIG. 1 as 10. The apparatus includes a freezing chamber 12 within which the confectionery product is frozen and stored until dispensed for consumption. Within the freezing chamber 12 is a beater or dasher 14 which mixes the frozen confectionery product with air to insure proper texture and consistency. The temperature of the product is maintained by appropriate refrigeration means which can be connected to a series of coils 16 surrounding the freezing chamber. The apparatus 10 also includes a liquid product reservoir 18 located above the freezing chamber 12. A tubular communicating line 20 extends between the liquid product reservoir 18 and the freezing chamber 12. The liquid product reservoir 18 is also maintained in a cool state by means of appropriate refrigerant coils 22 surrounding the liquid product reservoir. The liquid product 24 contained within the reservoir will generally have a readily identifiable maximum anticipated level indicated by line 26. As the frozen product 28 which is contained within freezing chamber 12 is withdrawn through spigot 30 an additional amount of mix and air enters the freezing chamber 12 by way of the tubular communicating line 20.

During any extended period of time during which no frozen product 28 is removed from the freezing chamber 12, the apparatus 10 periodically cycles off and on to insure that the temperature and consistency of the frozen product is maintained at the desired level. There is however a tendency for air present in the freezing chamber 12 to escape by way of the communicating line 20 thereby degrading the quality of the frozen product. An air-mix feeding element 32 is therefore included to assure consistency in the resultant product.

Figure 2:
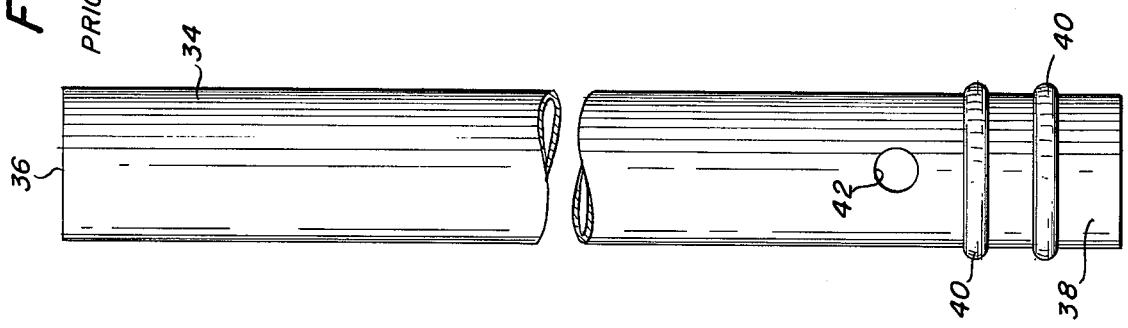
FIG. 2 is an elevation view of a prior art air-mix feeding element.

In many devices of the same general type as that illustrated as 10 in FIG. 1, an air-mix feeding element of the type illustrated in FIG. 2 is included to assure proper initial mixing of air and liquid product. The prior art-mix feeding element 34 consists of a single elongated tubular element extending from above the maximum anticipated level of the liquid product within reservoir 18 down to a point within communicating line 20. The upper end 36 of element 34 is thus always above the level of the liquid product 24 within chamber 18 while the lower end 38 is snugly yet removably received within the communcating line 20. The element 34 is secured within the communicating line 20 by means of a pair of O-rings 40 such that aperture 42 is only slightly above the bottom of reservoir 18. Most noteworthy is the fact that this prior art air-mix feeding element has no means for restricting or retarding the escape of air from the freezing chamber 12 through the communicating line 20.

Figure 3:
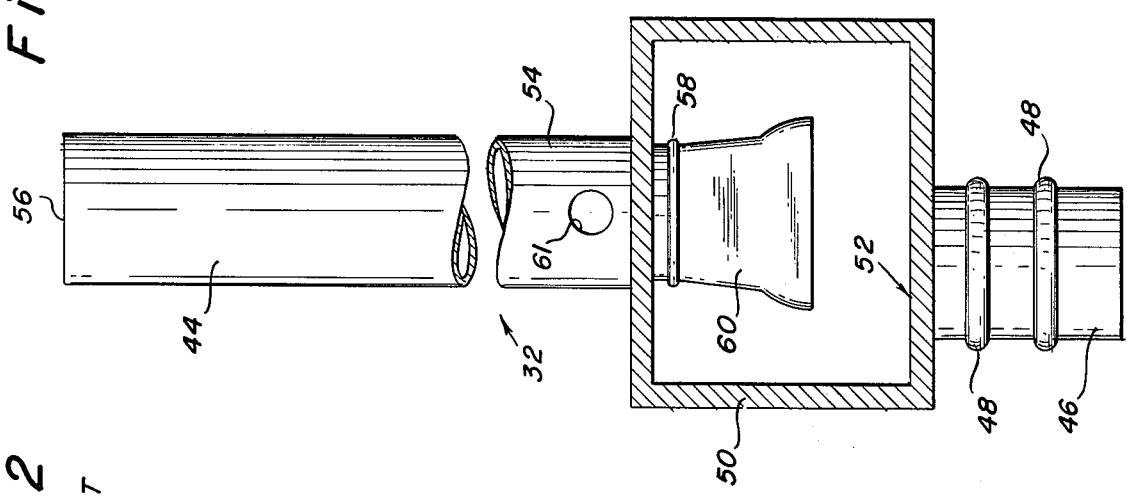
FIG. 3 is an elevation view partly in section of a first preferred embodiment of an improved air-mix feeding element according to this invention.

A first embodiment of an improved air-mix feeding element according to this invention is illustrated as 44 in FIG. 3. Element 44 comprises generally a lower tubular member 46 which is snugly yet removably received within the tubular communicating line 20 in a manner similar to that of element 34 by means of a pair of O-rings 48 similar to O-rings 40. Element 44 further comprising an air retaining chamber 50 fixed to the upper portion 52 of lower tubular member 46, the lower tubular member 46 opening into the air-retaining chamber 50. An upper tubular member 54 also fixed to chamber 50 extends upwardly to a point above the maximum anticipated level of the liquid product within reservoir 18, the upper end 56 always remaining above the maximum level 26. Near the lower end 58 of the upper tubular member 54 is a small aperture 61 opening into the liquid product reservoir 18 in a manner similar to aperture 42 of element 34. The lower end 58 of the upper tubular member 54 extends somewhat inside chamber 50 and at the lower end 58 a checkvalve 60 is attached for retaining the air in the air-retaining and freezing chambers 12 and 50 respectively to assure the desired overrun in the resultant dispensed food product 28.

While in theory the checkvalve 60 might be made to conform to any of a number of apparently suitable designs, the preferred checkvalve is illustrated in FIGS. 4 – 6. The checkvalve 60 generally comprises an elastomeric sleeve 62 which can include a rolled or otherwise reinforced end 64. The sleeve 62 and in particular the rolled or reinforced end 64 is expanded as necessary and slipped over the lower end 58 of tube 54. The reinforced end 64 can be received in any of a number of circumferential grooves 66 around tube 54. A flat plate 68 is inserted within the elastomeric sleeve 62 such that the elastomeric sleeve is laterally stretched to form a pair of lip-like portions 70 and 72 which sealingly engage the interstitial flat plate 68 as shown most dramatically in FIG. 5. The flat plate 68 has an outer periphery 74 which approximates a regular isosceles trapezoid. The narrower end 76 of plate 68 is directed toward and preferably engaged in the lower end 58 of tubular member 54. An appropriate slot 78 can be provided in the lower end 58 of tube 54 to accomodate the insertion of the narrow end 76 of plate 68. The wider end 80 of plate 68 is positioned substantially coterminous with the elastomeric sleeve 62 as shown in FIG. 5. The plate 68 preferably has a plurality of aperture 82 extending between the opposite faces 84 and 86 of the plate 68.

A second preferred embodiment of the air-mix feeding element 32 is shown in FIG. 7 generally as 88. The element 88 comprises a lower tubular member 90 which can be snuggly yet removably received within the tubular communicating line 20 and retained there with the aid of O-rings 92 similar to O-rings 40 and 48. The element 88 also comprises an air-retaining chamber 94 which functions in the same manner as air-retaining chamber 50. The air-retaining chamber 94 is fixed to the lower tubular member 90. The lower tubular member 90 extends upwardly within the air-retaining chamber 94 to a point 96 near the top thereof. The lower tubular member has an aperture 98 near the bottom of, and opening into, the air-retaining chamber 94. As illustrated in FIG. 7 the tubular member is constricted above the aperture 98 within the chamber 94 to form a throat 100.

The air-mix feeding element 88 also comprises an upper tubular member 102 fixed to chamber 94 and extending upward to a point 104 above the maximum anticipated level of the liquid product 24 in the liquid product reservoir 18. The lower end 106 of the upper tubular member is positioned in the lower half of the air-retaining chamber 94 and includes a check valve 60 substantially identical to that illustrated in FIGS. 3 through 6. An aperture 108 near the lower end 106 of upper tubular member 102 opens into the liquid product reservoir 18 through a side 110 of the air-retaining chamber 94 by means of a short tubular member 112. The aperture 108 functions similarly to aperture 60 and aperture 42 to permit liquid mix to flow from the reservoir 18 along with air drawn down through the upper tubular member when frozen product 28 is withdrawn from the freezing chamber 12 through spigot 30. The check valve 60 in both air-mix feeding elements 44 and 88 prevents the escape of air from freezing chamber 12 thus preventing the degradation of the frozen product through decreasing overrun. The air-retaining chambers 50 and 94 function similarly and in combination with checkvalves 60 to retain any air seeking to escape from the freezing chamber 12.

Although the invention has been described in considerable detail with reference to certain preferred embodiments thereof, it will be understood that variations and modifications can be effected within the spirit and scope of the invention as described above and as defined in the appended claims.

What is claimed is:

1. In an apparatus for freezing and dispensing a confectionery product, the apparatus comprising a freezing chamber, a liquid product reservoir located above the freezing chamber, and a tubular communicating line between the liquid product reservoir and the freezing chamber, an improved airmix feeding element for controlling the flow of air and liquid product through the tubular communicating line comprising:
   a. a lower tubular member snuggly yet removably received within the tubular communicating line,
   b. an air-retaining chamber fixed to an upper portion of the lower tubular member and communicating therewith,
   c. an upper tubular member fixed to the air-retaining chamber and extending upward to a point above the maximum anticipated level of the liquid product in the liquid product resivoir, the lower end of the upper tubular member extending somewhat inside the air-retaining chamber, the upper tubular member having near the lower end thereof a small aperture opening into the liquid product reservoir, and
   d. a checkvalve attached to the lower end of the upper tubular member for retaining air in the air-retaining and freezing chambers to assure the desired overrun in the resultant dispensed food product, the checkvalve comprising an elastomeric sleeve fixed to the lower end of the upper tubular member and a flat place disposed within the elastomeric sleeve, the flat plate being of such a size and being arranged such that the elastomeric sleeve is laterally stretched to form a pair of lip-like portions sealingly engaging the interstitial flat plate.

2. The improved air-mix feeding element of claim 1 wherein the flat plate has an outer periphery approximating a regular isoceles trapezoid, the narrower end of which is directed toward the lower end of the upper tubular member while the wider end is positioned near the lower end of the elastomeric sleeve.

3. The improved air-mix feeding element of claim 1 wherein the flat plate has a plurality of regularly spaced apertures extending between opposite faces of the plate.

4. In an apparatus for freezing and dispensing a confectionery product, the apparatus comprising a freezing chamber, a liquid product reservoir located above the freezing chamber, and a tubular communicating line between the liquid product reservoir and the freezing chamber, an improved airmix feeding element for controlling the flow of air and liquid product through the tubular communicating line comprising:
   a. a lower tubular member snugly yet removably received within the tubular communicating line,
   b. an air-retaining chamber fixed to an upper portion of the lower tubular member and communicating therewith, the lower tubular member extending upwardly to a point near the top of and within the air-retaining chamber and having an aperture near the bottom of, and opening into, the air-retaining chamber,
   c. an upper tubular member fixed to the air-retaining chamber and extending upward to a point above the maximum anticipated level of the liquid product in the liqid product reservoir, the lower end of the upper tubular member extending somewhat inside the air-retaining chamber, the upper tubular member having near the lower end thereof a small aperture opening into the liquid product reservoir, and
   d. a checkvalve means attached to the lower end of the upper tubular member for retaining air in the air-retaining and freezing chambers to assure the desired overrun in the resultant dispensed food product.

5. The improved air-mix feeding element of claim 4 wherein the lower tubular member is constricted to form a throat between the aperture near the bottom of an opening into the air-retaining chamber and the top of the lower tubular member.

6. In an apparatus for freezing and dispensing a confectionery product, the apparatus comprising a freezing chamber, a liquid product reservoir located above the freezing chamber, and a tubular communicating line between the liquid product reservoir and the freezing chamber, an improved airmix feeding element for controlling the flow of air and liquid product through the tubular communicating line comprising:
  a. a lower tubular member snugly yet removably received within the tubular communicating line,
  b. an air-retaining chamber fixed to an upper portion of the lower tubular member and communicating therewith,
  c. an upper tubular member fixed to the air-retaining chamber and extending upward to a point above the maximum anticipated level of the liquid product in the liquid product reservoir, the lower end of the upper tubular member being positioned in the lower half of the air-retaining chamber, the upper tubular member having near the lower end thereof a small aperture opening into the liquid product reservoir through a side of the air-retaining chamber, and
  d. a checkvalve means attached to the lower end of the upper tubular member for retaining air in the air-retaining and freezing chambers to assure the desired overrun in the resultant dispensed food product.

7. An apparatus for freezing and dispensing a confectionery product, the apparatus comprising a freezing chamber, a liquid product reservoir located above the freezing chamber, a tubular communicating line between the liquid product reservoir and the freezing chamber, and an air-mix feeding element for controlling the flow of air and liquid product from the liquid product reservoir to the freezing chamber through the tubular communicating line, the air-mix feeding element comprising:
  a. a lower tubular member snugly yet removably received within the tubular communicating line,
  b. an air-retaining chamber fixed to an upper portion of the lower tubular member, the lower tubular member extending upwardly within the air-retaining chamber to a point near the top of the air-retaining chamber, the lower tubular member having an aperture near the bottom of and opening into the air-retaining chamber, the lower tubular member being constricted to form a throat between the aperture near the bottom of and opening into the air-retaining chamber and the top of the lower tubular member,
  c. an upper tubular member fixed to the chamber and extending upward to a point above the maximum anticipated level of any liquid product in the liquid product reservoir, the lower end of the upper tubular member extending to a point in the lower half of the air-retaining chamber, the upper tubular member having near the lower end thereof a small aperture opening into the liquid product reservoir through a side of the air-retaining chamber, and
  d. a checkvalve attached to the lower end of the upper tubular member for retaining air in the air-retaining and freezing chambers, the checkvalve comprising an elastomeric sleeve fixed to the lower end of the upper tubular member and a flat plate disposed within the elastomeric sleeve, the flat plate having an outer periphery approximating a regular isosceles trapezoid, the narrower end of which is directed toward and received within a slot in the lower end of the upper tubular member while the wider end is positioned substantially coterminous with the lower end of the elastomeric sleeve, and flat plate being of such a size and being arranged such that the elastomeric sleeve is laterally stretched to form a pair of lip-like portions sealingly engaging the interstitial flat plate.

8. A checkvalve for retaining air in the freezing chamber of an apparatus for freezing and dispensing a frozen confectionery product, the checkvalve comprising an elastomeric sleeve and a flat plate disposed within the elastomeric sleeve the flat plate being of such a size and being arranged such that the elastomeric sleeve is laterally stretched to form a pair of lip-like portions sealingly engaging the interstitial flat plate.

9. The checkvalve of claim 8 wherein the flat plate has an outer periphery approximating a regular isosceles trapezoid and has a plurality of regularly spaced apertures extending between opposite faces of the plate.

* * * * *